No. 627,811. Patented June 27, 1899.
H. F. SHELDON.
BICYCLE DRIVING GEAR.
(Application filed July 19, 1898.)
(No Model.) 2 Sheets—Sheet I.
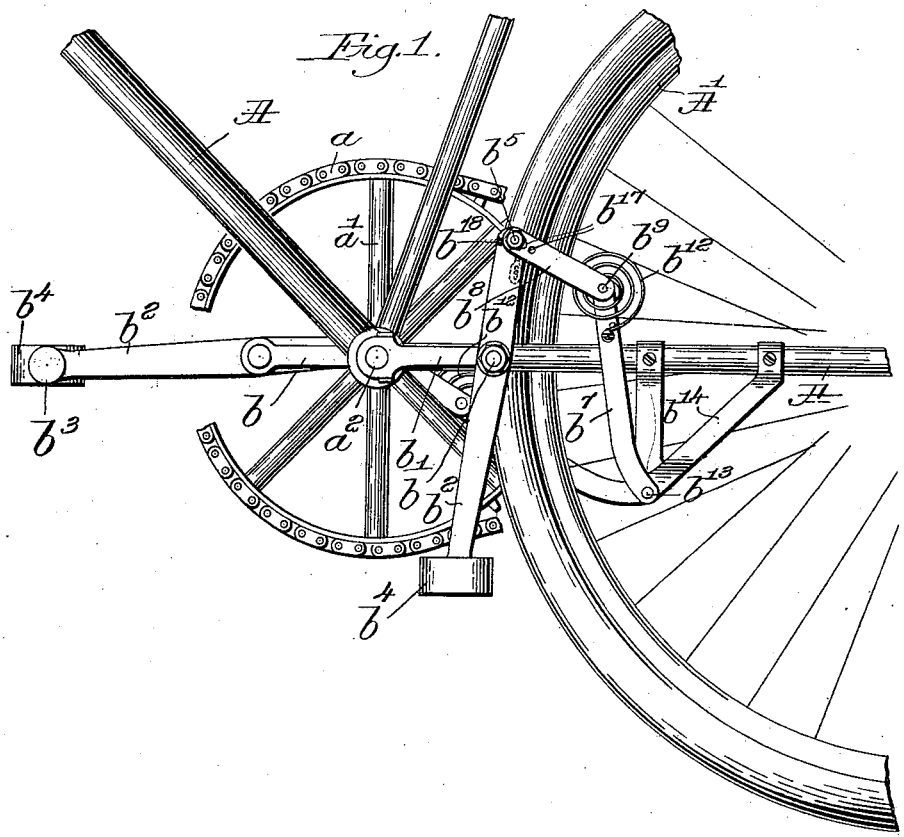
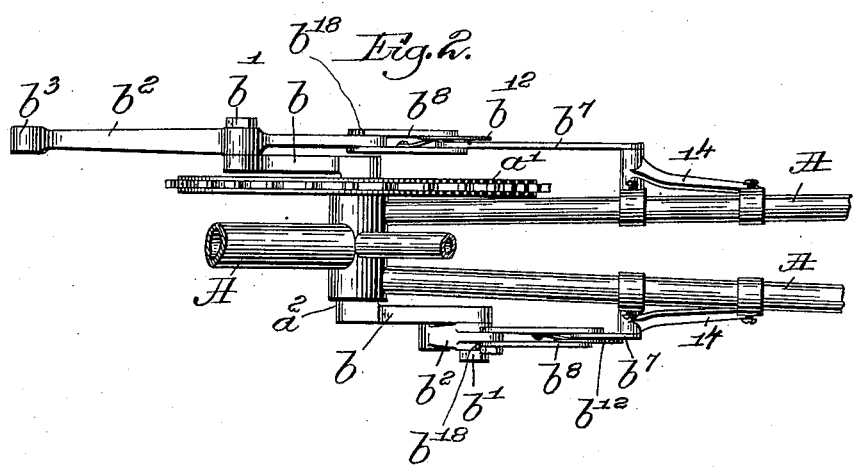
Witnesses:
Fred A. Grunhof
Edward H. Allen
Inventor:
Herbert F. Sheldon.
by Crosby & Gregory
Attys.

No. 627,811. Patented June 27, 1899.
H. F. SHELDON.
BICYCLE DRIVING GEAR.
(Application filed July 19, 1898.)
(No Model.) 2 Sheets—Sheet 2.
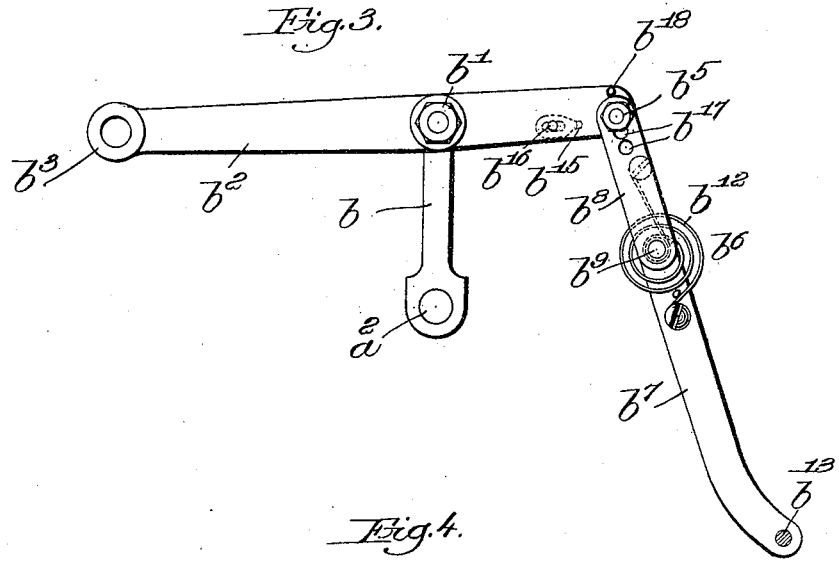
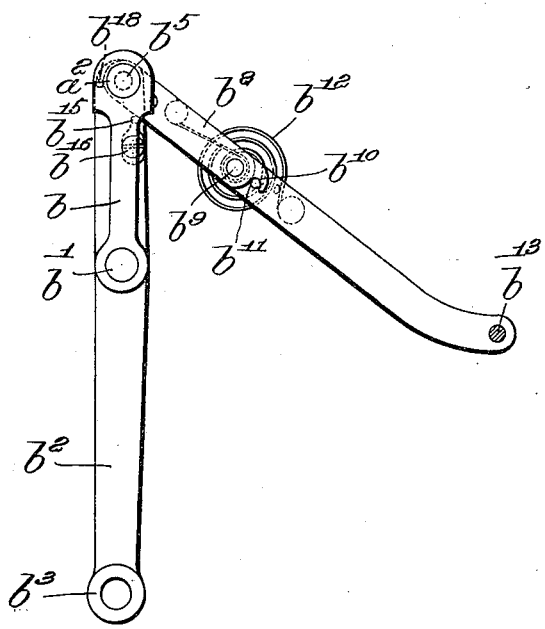
Witnesses:
Fred S. Greenleaf
Edward F. Allen
Inventor
Herbert F. Sheldon,
by Crosby Gregory
attys.

UNITED STATES PATENT OFFICE.

HERBERT F. SHELDON, OF MELROSE, MASSACHUSETTS, ASSIGNOR OF ONE-HALF TO EDWARD DE ANGUERA, OF WAKEFIELD, MASSACHUSETTS.

BICYCLE DRIVING-GEAR.

SPECIFICATION forming part of Letters Patent No. 627,811, dated June 27, 1899.

Application filed July 19, 1898. Serial No. 686,329. (No model.)

*To all whom it may concern:*

Be it known that I, HERBERT F. SHELDON, of Melrose, county of Middlesex, State of Massachusetts, have invented an Improvement in Bicycle Driving-Gear, of which the following description, in connection with the accompanying drawings, is a specification, like letters on the drawings representing like parts.

My invention has for its object the provision of a propelling mechanism for bicycles and like vehicles which will enable the rider to gain speed without a proportionate increase of exertion and fatigue on his part, an object thereof being to provide a driving-gear of this character in which the movements of the rider will correspond as nearly as may be to those ordinarily experienced in walking.

In connection with a usual chain-and-sprocket or any other form of gearing between the pedal-shaft and the drive-wheel I provide pedal connections, which include a short crank fixed to the pedal-shaft and having pivoted at its free end a pedal-lever whose direction of movement is controlled by a yielding bar secured thereto and to the frame in such manner as to be broken or caused to yield when pressure on the pedal is not required for driving the wheel.

The details of construction of my invention will be more fully apprehended from the following description, reference being had to the accompanying drawings, illustrative of a preferred embodiment of the invention, and the latter will be more particularly defined in the appended claims, also forming a part of this specification.

In the drawings, Figure 1 is a fragmentary view in side elevation, showing my improvements applied to a usual bicycle. Fig. 2 is a top plan view thereof. Fig. 3 shows in side elevation the pedal connections on the near side of the wheel in a different position from the previous figures. Fig. 4 is a view similar to Fig. 3, showing the opposite pedal connections in the position assumed thereby to correspond to Fig. 3.

The frame A, rear wheel A', and gearing, herein shown as a sprocket-chain $a$ and wheel $a'$, may be of any kind desired, my invention relating to the pedal connections for driving the pedal-shaft $a^2$. At the opposite ends of the pedal-shaft or crank-shaft $a^2$ I secure a short arm or crank $b$, extending in opposite directions, and at the free end of each crank $b$ is freely pivoted at $b'$ a pedal-lever $b^2$, intermediate its length, the forward end $b^3$ thereof being provided with a usual or other suitable pedal $b^4$ and the rear end thereof having loosely bolted thereto at $b^5$ a yielding bar $b^6$. The latter is composed of a lower part or link $b^7$ and an upper link or links $b^8$, jointed together at $b^9$, one of the links $b^8$ having a projecting finger $b^{10}$, adapted to engage a pin $b^{11}$ when the bar $b^6$ is straight, said bar being held in straight position by a spring of suitable kind, herein shown as a coil-spring $b^{12}$ and in practice inclosed by a suitable cap. The lower ends of the yielding bar $b^6$ are pivoted at $b^{13}$ to brackets $b^{14}$, depending from the frame of the machine, said brackets being herein shown as adjustable on the frame, although it will be understood that they may be made as a part of the frame, if desired.

Adjacent the rear end of the pedal-lever $b^2$ I provide a lug $b^{15}$, preferably adjustable thereon, as shown at $b^{16}$, said lug being adapted to engage one of the links $b^8$ at the proper moment in order to break the joint of the bar $b^6$, as and for a purpose presently to be described. Also the pivotal point $b^5$ is preferably adjustable relatively to the pedal-lever $b^2$ and the bar $b^6$, the adjustment being herein shown as confined to the latter, holes $b^{17}$ being provided therein for the purpose. A lug $b^{18}$ extends from lever $b^2$ to prevent the pivot $b^5$ dropping below the axis $a^2$ when the parts are straightened out.

The operation of my improved pedaling-gear is as follows: When the parts are in the position shown in Fig. 3, it being understood that the foot is depressing the forward free end of the pedal-lever $b^2$, it will be evident that the crank-shaft at $a^2$ will be turned by the forward movement of the crank $b$, the downward movement of said free end of the lever $b^2$ being, however, slow at the start, the bar $b^2$ acting on $b^5$ as a fulcrum to turn and depress the free end of the crank $b$. As the pedal-lever $b^2$ and the crank $b$ get into longitudinal alinement with each other, as shown in the far side of Fig. 1, the pivotal point $b^5$ coincides with the axis of the crank-shaft, so that the crank-shaft is turned by a leverage extending therefrom for the entire length of the pedal-lever. The parts remain in this relative position until such time as the lug $b^{15}$ engages a link $b^8$ of the arm $b^6$, whereupon the latter is broken, thereby permitting the pedal-lever $b^2$ to swing rearwardly out of alinement with the crank $b$ into the position shown on the near side of Fig. 1, so that as a result the pedal does not swing around in the usual circular path, but has a comparatively very limited movement, this movement corresponding more nearly to that assumed by the foot in walking, as will be evident from studying the drawings.

The stop or lug $b^{15}$ may be adjusted so as to cause the breaking of the bar $b^6$ to take place at such point in the downward movement of the pedal as may be desired, and the position and elevation of the pedal may be varied by adjusting the pivot $b^5$ in the holes $b^{17}$, so as to vary the power and leverage.

I am aware that certain other devices have been heretofore proposed for obtaining a varying leverage as the pedals travel, and I do not therefore claim this feature broadly, but limit myself to the arrangement of parts substantially as described, this improvement being exceedingly practical, economical, and compact, all of which advantages are exceedingly desirable in this class of vehicles. I do not intend, however, to limit myself to the precise details herein shown. For instance, while I prefer a spring of the form herein shown, it will be understood that any other means of permitting the connection between the pivots $b^5$ and $b^{13}$ to yield or shorten its length when desired may be employed, and also any other means than the stop or lug $b^{15}$ may be substituted for occasioning the yielding mentioned; nor do I intend to limit myself otherwise than as hereinafter expressed in the claims broadly interpreted.

Having described my invention, what I claim, and desire to secure by Letters Patent, is—

1. In a device of the kind described, the combination with a crank-shaft and its crank, of a pedal-lever pivoted intermediate its ends to the free end of said crank, and having a pedal at its forward end, and a yielding connection to the frame at its rear end, said connection yielding for shortening during operation, substantially as described.

2. In a device of the kind described, a crank-shaft and its crank, combined with a pedal-lever pivoted intermediate its ends to the free end of said crank, a pedal at one end of said lever, the other end thereof being connected to the frame, the connection including means maintaining said lever and crank in longitudinal alinement throughout a considerable portion of the effective or propelling movement of the pedal, substantially as described.

3. In a device of the kind described, the combination with a crank-shaft and its crank, of a pedal-lever pivoted intermediate its ends to the free end of said crank, and having a pedal at its forward end, and a bar pivoted at one end to the rear end of said lever, and at its other end to the frame of the machine, means normally maintaining the pivotal points of said bar at a predetermined distance apart, and means permitting said pivots to approach each other during the ineffective or idle movement of the pedal, substantially as described.

4. In a device of the kind described, the combination with a crank-shaft and its crank, of a pedal-lever pivoted intermediate its ends to the free end of said crank, and having a pedal at its forward end, and a bar pivoted at one end to the rear end of said lever, and at its other end to the frame of the machine, said bar being intermediately jointed and having a spring normally maintaining said bar straight but permitting the bar to break at its said joint, substantially as described.

5. In a device of the kind described, a crank-shaft and its crank, combined with a pedal-lever pivoted intermediate its ends to the free end of said crank and having a pedal at its forward end and a yielding connection at its other end to a stationary part, said lever from its said intermediate pivot to the said connection at its rear end being of the same length as the said crank, and said connection being of a length to maintain the said rear end of said lever coincident with the axis of said crank-shaft during a considerable portion of the effective or propelling movement of the pedal, substantially as described.

In testimony whereof I have signed my name to this specification in the presence of two subscribing witnesses.

HERBERT F. SHELDON.

Witnesses:
 GEO. H. MAXWELL,
 JOHN C. EDWARDS.